No. 769,432. PATENTED SEPT. 6, 1904.
C. C. CHINN.
LUBRICATED BEARING.
APPLICATION FILED SEPT. 25, 1903.
NO MODEL.

Witnesses
Chas. K. Davies
Chas. I. Mason

Inventor
C. C. Chinn,
by F. E. Stebbins
Attorney

No. 769,432.

Patented September 6, 1904.

UNITED STATES PATENT OFFICE.

CHRISTOPHER C. CHINN, OF ASHLAND, KENTUCKY.

LUBRICATED BEARING.

SPECIFICATION forming part of Letters Patent No. 769,432, dated September 6, 1904.

Application filed September 26, 1903. Serial No. 174,675. (No model.)

*To all whom it may concern:*

Be it known that I, CHRISTOPHER C. CHINN, a citizen of the United States, residing at Ashland, in the county of Boyd and State of Kentucky, have invented new and useful Improvements in Lubricated Bearings for Pulleys, of which the following is a specification.

My invention relates to a lubricated bearing for a loose pulley, the object being the provision of a bearing which may be shifted when it becomes worn and which shall be efficiently lubricated.

The invention consists in certain novelties of construction and combinations of parts, as hereinafter set forth, and pointed out in the claims.

The accompanying drawings illustrate an example of the physical embodiment of the invention constructed according to the best mode I have so far devised for the practical application of the principle.

Figure 1:
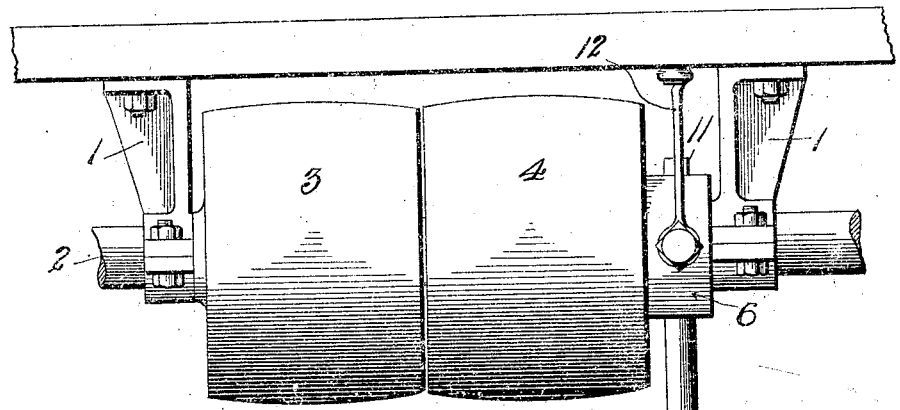
Figure 4:
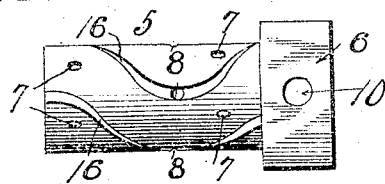
Figure 2:
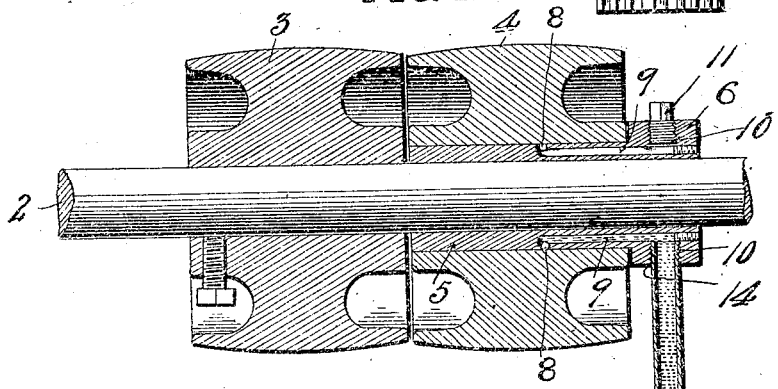
Figure 3:
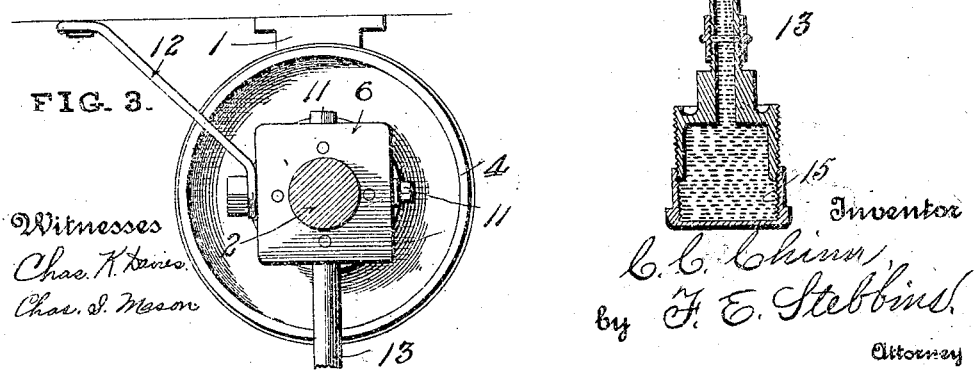

Figure 1 shows a shaft supported by two hangers, two pulleys, (one loose and the other fixed,) a bushing supporting the loose pulley, and the means for oiling the bushing. Fig. 2 is a perpendicular sectional view of Fig. 2, the section being taken on the line of the shaft. Fig. 3 is an end view of Fig. 1, showing the flanged or enlarged part of the bushing. Fig. 4 is a plan view of the bushing removed from the shaft.

Referring to the several figures, the numeral 1 designates the shaft-hangers; 2, the rotary shaft; 3, a fixed pulley secured to the shaft by a set-screw; 4, a loose pulley; 5, the lubricated bushing mounted upon the shaft and located within the loose pulley; 6, the enlarged head or flanged portion of the bushing; 7, holes through the cylindrical body portion of the bushing; 8, four holes extending from the outer surface of the bushing into the body of the same; 9, four passages leading from the holes 8 to the head or flanged portion of the bushing; 10, four threaded holes communicating with the passages 9, respectively; 11, three threaded plugs located in three of the threaded holes 10 in the flange; 12, an anchoring device, such as a rod or bar, secured at one end to a plug 11 and at the other end to the floor or wall which supports the hangers, its function being to prevent the rotation of the bushing upon the shaft; 13, an oil-cup having a forced feed; 14, the threaded end of the oil-cup stem engaging one of the threaded holes 10 in the flange of the bushing; 15, the threaded bottom of the cup engaging threads on the wall of the body portion of the cup, so that when the bottom is turned oil will be forced from the cup, and 16 represents curved or irregular-shaped grooves in the exterior surface of the bushing and intersecting the holes 8 in the surface of the bushing, their function being to distribute the oil or lubricant from the central portion of the bushing outwardly.

The inner and outer surfaces of the bushing where they are in contact with the shaft and the inner surface of the loose pulley are lubricated as follows: The threaded bottom of the oil-cup is turned so as to advance it toward the body portion thereof, which action forces the oil or other lubricant by way of the stem into the passage 9 and from thence outwardly to the hole 8 and into a groove 16, the revolution of the loose pulley distributing the lubricant and the holes 7 through the body of the bushing allowing the oil or other lubricant to pass to the inner surface of the bushing and the outer surface of the shaft.

It will be observed that by my invention the shaft 2 is lubricated where it contacts with the bushing and that the inner surface of the loose pulley is also lubricated where it bears upon the bushing. When the bushing has become worn, the anchoring device is removed, the bushing shifted through an arc of ninety degrees and a plug 11 removed, and the stem of the oil-cup located in another of the holes 10 in the flange of the bushing. The bushing can be provided with any suitable number of passages 9, holes 8, and holes 10 to allow the shifting of the bushing through small arcs of a circle.

From the foregoing description, taken in connection with the drawings, it will be evident that I have produced an improved lubricated bearing of great durability and efficiency which permits of the efficient lubrication of the loose pulley and the shaft and which constitutes a superior means for mounting a loose pulley upon a shaft.

What I claim as new, and desire to secure by Letters Patent, is—

1. The combination with a shaft, of a bushing located thereupon, a loose pulley upon the bushing, and means for anchoring the bushing in different positions upon and around the shaft; said bushing being provided with holes 10, passages 9, and holes 8 in the surface of the bushing for the passage of oil to the bearing-surfaces of the bushing and pulley.

2. The combination with a shaft, of a bushing, having a flange or head, a loose pulley on the bushing, and means for anchoring the bushing in different positions upon and around the shaft; said bushing being provided with means for the passage of oil from the flange or head of the bushing to the outer surface of the bushing and the inner surface of the pulley, and with holes 7 through the bushing for the delivery of oil to the inner bearing-surface of the bushing.

3. The combination with a shaft, of a bushing thereupon, a loose pulley on the bushing, and means for anchoring the bushing: said bushing having a groove 16, hole 8, passage 9, and hole 10 for the introduction of oil.

4. The combination with a shaft, of a bushing with a flange or head located upon the shaft, a loose pulley on the bushing, and means for anchoring the bushing in different positions upon and around the shaft; said bushing being provided with a plurality of holes 8 passages 9 and holes 10, said holes 10 being adapted to receive the stem of an oil-cup.

5. The combination with a shaft, of a bushing provided with holes 7 therethrough, grooves 16, holes 8, passages 9, and holes 10, means for closing the holes 10, and a loose pulley upon the bushing.

6. The combination with a shaft having a fixed pulley thereupon, of a bushing on the shaft, a loose pulley on the bushing, means for anchoring the bushing, and means for lubricating the surface of the bushing; said bushing being adapted as it becomes worn to be rotated about the shaft and anchored in different positions thereupon.

In testimony whereof I affix my signature in presence of two witnesses.

CHRISTOPHER C. CHINN.

Witnesses:
O. F. L. BUKELER,
W. M. SALISBURY.